US011620077B2

(12) United States Patent
Borgonovo et al.

(10) Patent No.: US 11,620,077 B2
(45) Date of Patent: Apr. 4, 2023

(54) METHOD OF ACCESSING A MEMORY, AND CORRESPONDING CIRCUIT

(71) Applicant: STMicroelectronics S.r.l., Agrate Brianza (IT)

(72) Inventors: Giampiero Borgonovo, Giussano (IT); Lorenzo Re Fiorentin, Turin (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 71 days.

(21) Appl. No.: 17/224,747

(22) Filed: Apr. 7, 2021

(65) Prior Publication Data

US 2021/0342091 A1    Nov. 4, 2021

(30) Foreign Application Priority Data

Apr. 29, 2020 (IT) .......................... 102020000009364

(51) Int. Cl.
*G06F 3/06* (2006.01)
*G06F 13/42* (2006.01)

(52) U.S. Cl.
CPC ............ *G06F 3/0655* (2013.01); *G06F 3/061* (2013.01); *G06F 3/0673* (2013.01); *G06F 13/4234* (2013.01); *G06F 2213/16* (2013.01)

(58) Field of Classification Search
CPC ...... G06F 3/061; G06F 3/0655; G06F 3/0673; G06F 13/4237; G06F 2213/16
USPC ........................................................ 711/154
See application file for complete search history.

(56) References Cited

U.S. PATENT DOCUMENTS

| | | | | |
|---|---|---|---|---|
| 10,146,714 B1* | 12/2018 | Lurie | ................... | G06F 11/3027 |
| 10,725,958 B1* | 7/2020 | Ringe | ................. | G06F 13/4059 |
| 10,761,939 B1* | 9/2020 | Xu | ......................... | G06F 11/141 |
| 10,831,693 B1* | 11/2020 | Huang | .................... | H04L 12/18 |
| 2008/0235415 A1* | 9/2008 | Clark | ................... | G06F 30/3312 |
| | | | | 710/105 |

(Continued)

FOREIGN PATENT DOCUMENTS

EP    0862118 A1    9/1998

OTHER PUBLICATIONS

Sohi, Gurindar Singh, "High-bandwidth Interleaved Memories for Vector Processors—A Simulation Study", IEEE Transactions on Computers, vol. 42, No. 1, Jan. 1993, doi: 10.1109/12.192212, 11 pages.

(Continued)

*Primary Examiner* — Christopher B Shin
(74) *Attorney, Agent, or Firm* — Slater Matsil, LLP

(57) ABSTRACT

An embodiment method of accessing a memory for reading and/or writing data comprises generating a memory transaction request comprising a burst of memory access requests towards a set of memory locations in the memory, the memory locations having respective memory addresses. The method further comprises transmitting via an interconnect bus to a memory controller circuit coupled to the memory a first signal conveying the memory transaction request and a second signal conveying information for mapping the burst of memory access requests onto respective memory addresses of the memory locations in the memory. The method further comprises computing, as a function of the information conveyed by the second signal, respective memory addresses of the memory locations, and accessing the memory locations to read data from the memory locations and/or to write data into the memory locations.

19 Claims, 2 Drawing Sheets

(56) References Cited

U.S. PATENT DOCUMENTS

| | | | |
|---|---|---|---|
| 2008/0320255 A1 | 12/2008 | Wingard et al. | |
| 2011/0271075 A1* | 11/2011 | Ahn | G06F 12/10 |
| | | | 711/206 |
| 2012/0191925 A1 | 7/2012 | Kimori | |
| 2014/0006644 A1* | 1/2014 | Pullagoundapatti | G06F 12/0284 |
| | | | 710/4 |
| 2015/0339424 A1* | 11/2015 | Chang | G06F 13/20 |
| | | | 716/136 |
| 2016/0116971 A1* | 4/2016 | Luan | G06F 1/3287 |
| | | | 713/323 |
| 2016/0132237 A1* | 5/2016 | Jeong | G06F 3/061 |
| | | | 711/103 |
| 2016/0188501 A1* | 6/2016 | Chan | G06F 13/4068 |
| | | | 710/113 |
| 2017/0293702 A1* | 10/2017 | Clark | G06F 30/33 |
| 2018/0241901 A1* | 8/2018 | Ueta | H04N 1/217 |
| 2019/0188164 A1* | 6/2019 | Avrukin | G06F 13/40 |
| 2019/0188173 A1* | 6/2019 | Otani | G06F 13/1652 |
| 2019/0278926 A1* | 9/2019 | Guarnaccia | G06F 21/606 |
| 2020/0089634 A1* | 3/2020 | Jalal | G06F 13/28 |
| 2020/0371867 A1* | 11/2020 | Imaizumi | G06F 11/1012 |
| 2021/0026787 A1* | 1/2021 | Motoyama | G06F 12/1483 |
| 2021/0303508 A1* | 9/2021 | Morshed | G06F 13/4027 |

OTHER PUBLICATIONS

Takala, Jarmo H., et al., "Conflict-Free Parallel Memory Access Scheme For FFT Processors", IEEE Proceedings International Symposium on Circuits and Systems, Thailand, May 25-28, 2003, 4 pages.

* cited by examiner

METHOD OF ACCESSING A MEMORY, AND CORRESPONDING CIRCUIT

CROSS-REFERENCE TO RELATED APPLICATIONS

This application claims the benefit of Italian Application No. 102020000009364, filed on Apr. 29, 2020, which application is hereby incorporated herein by reference.

TECHNICAL FIELD

The description relates to digital signal processing circuits, such as hardware accelerators, and related methods, devices and systems.

BACKGROUND

A variety of real-time digital signal processing systems (e.g., for processing video data and/or image data, radar data, wireless communication data as increasingly demanded in the automotive field) may involve processing a relevant amount of data per unit of time.

To this regard, various digital signal processors (e.g., co-processors for computing algorithms such as Fast Fourier Transform (FFT), beamforming, finite impulse response (FIR) filters, neural networks, etc.) are known in the art. Amongst them, pipelined architectures and memory-based architectures are two known solutions.

In order to efficiently handle resource-demanding processing (e.g., computation of FFT algorithms over large datasets and/or of different sizes), memory-based architectures may be preferred.

However, digital signal processors known in the art may not provide memory access schemes adapted for efficient computation of certain algorithms.

SUMMARY

An object of one or more embodiments is that of providing a method of accessing a memory in a digital signal processor which solves the above-mentioned drawback.

One or more embodiments may aim at providing a communication bus controller (for instance, for an advanced microcontroller bus architecture (AMBA) advanced extensible interface (AXI) bus) adapted for high performance digital signal processing applications. This may be achieved by extending the allowable incremental/wrapping burst transactions and by specifying the memory bank access scheme to be used using optional user-available signals.

According to one or more embodiments, such an object can be achieved by means of a method having the features set forth in the claims that follow.

One or more embodiments may relate to a corresponding circuit.

The claims are an integral part of the technical teaching provided herein in respect of the embodiments.

According to one or more embodiments, it is provided a method of accessing a memory for reading and/or writing data. The method may comprise generating a memory transaction request comprising a burst of memory access requests towards a set of memory locations in the memory, wherein the memory locations have respective memory addresses. The method may comprise transmitting signals via an interconnect bus to a memory controller circuit coupled to the memory. A first signal may convey the memory transaction request and a second signal may convey information for mapping the burst of memory access requests onto respective memory addresses of the memory locations in the memory. The method may comprise computing, as a function of the information conveyed by the second signal, respective memory addresses of the memory locations, and accessing the memory locations to read data from the memory locations and/or to write data into the memory locations.

Therefore, one or more embodiments may advantageously provide the possibility of grouping together different single memory accesses into a single burst transaction on a bus, and/or the possibility of encoding inside the transaction burst the memory bank access scheme to be used. One or more embodiments may be compatible with existing bus standards (e.g., AXI4, AXI3).

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

Throughout the figures annexed herein, like parts or elements are indicated with like references/numerals and a corresponding description will not be repeated for brevity.

The references/headings used herein are provided merely for convenience and hence do not define the extent of protection or the scope of the embodiments.

Figure 1:
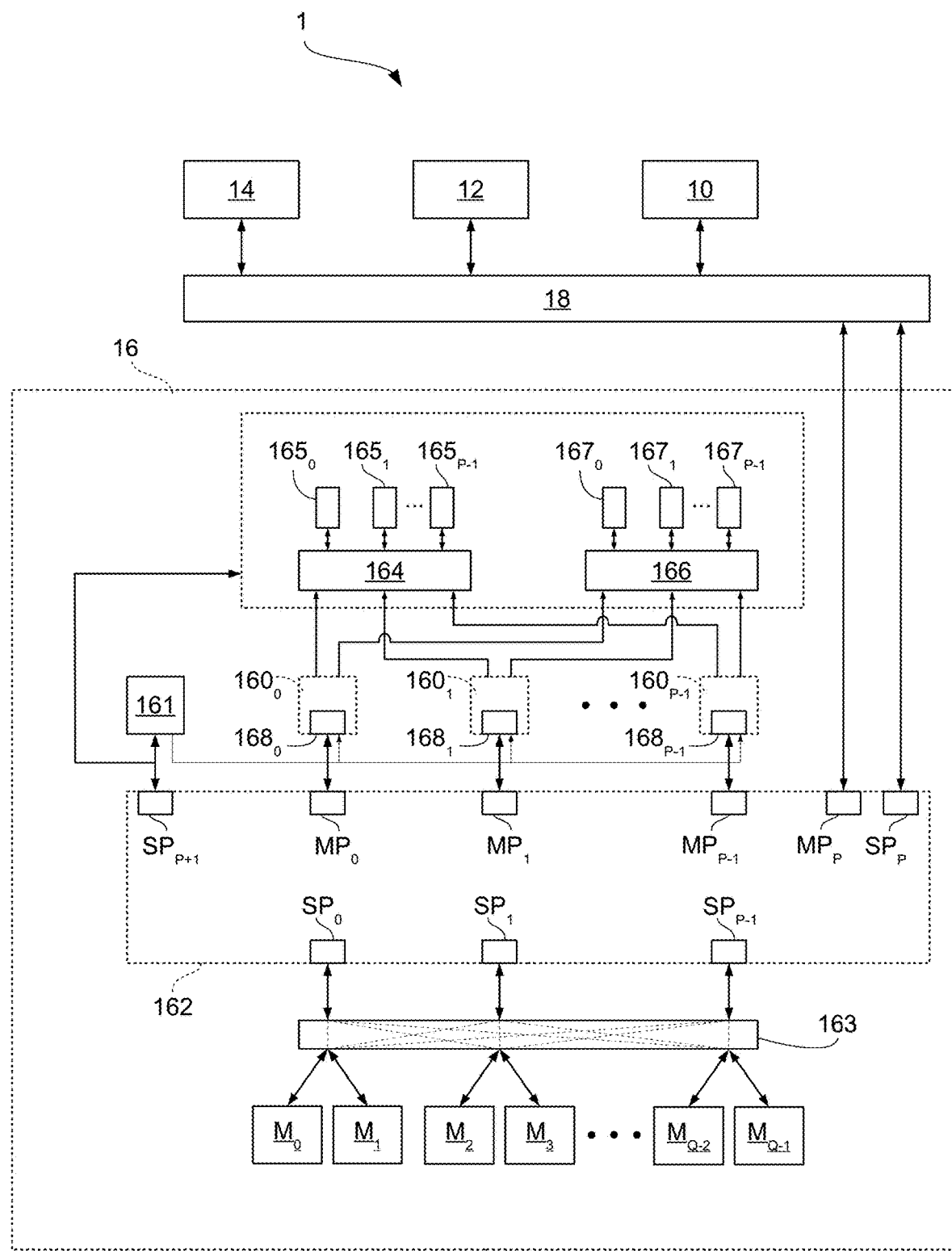
FIG. 1 is a circuit block diagram exemplary of an electronic system, such as a system-on-chip, according to one or more embodiments.

By way of introduction to the detailed description of exemplary embodiments, reference may be first made to FIG. 1. FIG. 1 is a circuit block diagram exemplary of an electronic system 1 according to one or more embodiments, such as a system-on-chip (SoC) designed for digital signal processing. The electronic system 1 may comprise electronic circuits such as, for instance: a central processing unit 10 (CPU, e.g., a microprocessor), a main system memory 12, (e.g., a system RAM-Random Access Memory), a direct memory access controller 14, and a digital signal processor 16 (e.g., a hardware accelerator circuit such as, for instance, a memory-based FFT co-processor).

It will be understood that, in the present description, any specific reference to a FFT co-processor when designating the digital signal processor 16 is made purely by way of non-limiting example. As will be clear from the description that follows, a digital signal processor 16 according to one or more embodiments may be configured to perform a variety of different algorithms.

As exemplified in FIG. 1, the electronic circuits in the electronic system 1 may be connected by means of a system interconnect network 18, e.g., a SoC interconnect, network on chip, network interconnect or crossbar.

As exemplified in FIG. 1, in one or more embodiments a digital signal processor 16 may comprise at least one processing element 160, preferably a number P of processing elements $160_0, 160_1, \ldots, 160_{P-1}$, and a set of local data memory banks $M_0, \ldots, M_{Q-1}$.

In one or more embodiments, the digital signal processor 16 may further comprise a local control unit 161, a local interconnect network 162, a local data memory controller 163, a local ROM controller 164 coupled to a set of local read-only memories 165, preferably a number P of local read-only memories $165_0, 165_1, \ldots, 165_{P-1}$, and a local configuration memory controller 166 coupled to a set of local configurable coefficient memories 167, preferably a number P of local configurable coefficient memories $167_0, 167_1, \ldots, 167_{P-1}$.

In one or more embodiments, the processing elements $160_0, 160_1, \ldots, 160_{P-1}$ may comprise math operators such as, for instance, radix-2 butterfly units and/or multiply-and-accumulate (MAC) units. In various embodiments, higher radix arithmetic processing units can be used, e.g., being generically referred to as radix-S butterfly units. In various embodiments, the processing elements 160 may be reconfigurable to perform different operations at different times.

The processing elements 160 may comprise respective internal direct memory access controllers $168_0, 168_1, \ldots, 168_{P-1}$ having a low complexity. In particular, a processing element 160 may be configured to retrieve input data from the local data memory banks $M_0, \ldots, M_{Q-1}$ and/or from the main system memory 12 through the respective direct memory access controller. The processing element 160 may thus elaborate the retrieved input data to generate processed output data. The processing element 160 may be configured to store the processed output data in the local data memory banks $M_0, \ldots, M_{Q-1}$ and/or in the main system memory 12 through the respective direct memory access controller.

In one or more embodiments, a number Q=S*P of local data memory banks $M_0, \ldots, M_{Q-1}$ may be provided in order to avoid memory access conflicts during parallel computation carried out by the P processing elements $160_0, 160_1, \ldots, 160_{P-1}$. Thus, in a preferred embodiment comprising radix-2 butterfly units, a number Q=2*P of local data memory banks $M_0, \ldots, M_{Q-1}$ may be provided.

Preferably, the local data memory banks $M_0, \ldots, M_{Q-1}$ may be provided with buffering (e.g., double buffering) which may facilitate recovering the memory upload time (write operation) and/or download time (read operation). In particular, each local data memory bank may be duplicated, so that data can be read (e.g., for being processed) from one of the two memory banks and (new) data can be stored (e.g., for being processed later) in the other memory bank at the same time. As a result, moving data may not negatively affect computation performances, as it may be masked.

In one or more embodiments, a double buffering scheme of the local data memory banks $M_0, \ldots, M_{Q-1}$ may be advantageous in combination with data processing in streaming mode or back to back (e.g., as applicable to a FFT N-point processor that is configured to elaborate continuous sequences of N data inputs).

In one or more embodiments, the local data memory banks $M_0, \ldots, M_{Q-1}$ may comprise memory banks having a limited storage capacity (and thus, a limited silicon footprint). In the exemplary case of a FFT processor, each of the local data memory banks may have a storage capacity of at least (max N)/Q, where max N is the longest FFT that the hardware is able to handle. Typical values in applications that involve a hardware accelerator may be the following:

N=4096 points, with each point being, for instance, a floating-point single precision complex number (real, img) having a size of 64 bits (or 8 bytes), P=8, resulting in Q=16, so that the storage capacity of each memory bank may be equal to (4096*8 bytes)/16=2 KB (KB=kilobyte).

In one or more embodiments, the local interconnect network 162 may comprise a low complexity interconnect system, e.g., based on a bus network of a known type such as an AXI-based interconnect. For instance, the data parallelism of the local interconnect network 162 may be on 64 bits and the address width may be 32 bits.

The local interconnect network 162 may be configured to connect the processing elements 160 to the local data memory banks $M_0, \ldots, M_{Q-1}$ and/or to the main system memory 12. Additionally, the local interconnect network 162 may be configured to connect the local control unit 161 and the local configuration memory controller 166 to the system interconnect network 18.

In particular, the interconnect network 162 may comprise a set of P master ports $MP_0, MP_1, \ldots, MP_{P-1}$, each of these master ports being coupled to a respective processing element 160; a set of P slave ports $SP_0, SP_1, \ldots, SP_{P-1}$, each of these slave ports being couplable via the local data memory controller 163 to the local data memory banks $M_0, \ldots, M_{Q-1}$; a further pair of ports comprising a system master port $MP_P$ and a system slave port $SP_P$ for coupling to the system interconnect network 18 (e.g., in order to receive instructions from the central processing unit 10 and/or to access data stored in the system memory 12); and a still further slave port $SP_{P+1}$ coupled to the local control unit 161 and to the local configuration memory controller 166.

In one or more embodiments, the interconnect network 162 may be fixed (i.e., not reconfigurable).

In an exemplary embodiment (see, e.g., Table I-1 provided in the following, where an "X" sign indicates an existing connection between two ports), the interconnect network 162 may implement the following connections: each of the P master ports $MP_0, MP_1, \ldots, MP_{P-1}$ coupled to a processing element 160 may be connected to a respective slave port $SP_0, SP_1, \ldots, SP_{P-1}$ coupled to the local data memory controller 163; and the system master port $MP_P$ coupled to the system interconnect network 18 may be connected to the slave port $SP_{P+1}$ coupled to the local control unit 161 and to the local configuration memory controller 166.

Table I-1 provided in the following summarizes such exemplary connections implemented by means of the interconnect network 162.

TABLE I-1

|        | $SP_0$ | $SP_1$ | ... | $SP_{P-1}$ | $SP_P$ | $SP_{P+1}$ |
|--------|--------|--------|-----|------------|--------|------------|
| $MP_0$ | X      |        |     |            |        |            |
| $MP_1$ |        | X      |     |            |        |            |
| ...    |        |        | ... |            |        |            |
| $MP_{P-1}$ |    |        |     | X          |        |            |
| $MP_P$ |        |        |     |            | X      |            |

In another exemplary embodiment (see, e.g., Table I-2 provided in the following, where an "X" sign indicates an existing connection between two ports), the interconnect network 162 may further implement the following connections: each of the P master ports $MP_0$, $MP_1$, ..., $MP_{P-1}$ may be connected to the system slave port $SP_P$ coupled to the system interconnect network 18. In this way, connectivity may be provided between any processing element 160 and the SOC via the system interconnect network 18.

Table I-2 provided in the following summarizes such exemplary connections implemented by means of the interconnect network 162.

TABLE I-2

|        | $SP_0$ | $SP_1$ | ... | $SP_{P-1}$ | $SP_P$ | $SP_{P+1}$ |
|--------|--------|--------|-----|------------|--------|------------|
| $MP_0$ | X      |        |     |            | X      |            |
| $MP_1$ |        | X      |     |            | X      |            |
| ...    |        |        | ... |            | ...    |            |
| $MP_{P-1}$ |    |        |     | X          | X      |            |
| $MP_P$ |        |        |     |            |        | X          |

In another exemplary embodiment (see, e.g., Table I-3 provided in the following, where an "X" sign indicates an existing connection between two ports, and an "X" in parentheses indicates an optional connection), the interconnect network 162 may further implement the following connection: the system master port $MP_P$ coupled to the system interconnect network 18 may be connected to at least one of the slave ports $SP_0$, $SP_1$, ..., $SP_{P-1}$ (here, the first slave port $SP_0$ in the set of P slave ports $SP_0$, $SP_1$, ..., $SP_{P-1}$). In this way, connection may be provided between the master port $MP_P$ and (any) slave. According to the specific application of the system 1, connection of the master port $MP_P$ may be extended to a plurality of (e.g., all) the slave ports $SP_0$, $SP_1$, ..., $SP_{P-1}$. Connection of the master port $MP_P$ to at least one of the slave ports $SP_0$, $SP_1$, ..., $SP_{P-1}$ may be used (only) to load the input data to be processed into the local data memory banks $M_0$, ..., $M_{Q-1}$, insofar as all data memory banks may be accessed via a single slave port. Loading input data can be done using only one slave port, while processing the data by means of parallel computation may take advantage of using a plurality (e.g., all) of the slave ports $SP_0$, $SP_1$, ..., $SP_{P-1}$.

Table I-3 provided in the following summarizes such exemplary connections implemented by means of the interconnect network 162.

TABLE I-3

|        | $SP_0$ | $SP_1$ | ... | $SP_{P-1}$ | $SP_P$ | $SP_{P+1}$ |
|--------|--------|--------|-----|------------|--------|------------|
| $MP_0$ | X      |        |     |            | X      |            |
| $MP_1$ |        | X      |     |            | X      |            |
| ...    |        |        | ... |            | ...    |            |
| $MP_{P-1}$ |    |        |     | X          | X      |            |
| $MP_P$ | X      | (X)    | (X) | (X)        |        | X          |

Additionally, the processing elements 160 may be configured to retrieve input data from the local read-only memory 165 and/or from the local configurable coefficient memory 167 to perform such elaboration.

In one or more embodiments, the local read-only memories $165_0$, $165_1$, ..., $165_{P-1}$ accessible by the processing elements 160 via the local ROM controller 164 may be configured to store numeric factors and/or coefficients for implementation of specific algorithms or operations (for instance, twiddle factors for FFT computation or other complex coefficients). The local ROM controller 164 may implement specific address schemes.

In one or more embodiments, the local configurable coefficient memories $167_0$, $167_1$, ..., $167_{P-1}$ accessible by the processing elements 160 via the local configuration memory controller 166 may be configured to store application-dependent numeric factors and/or coefficients which can be configured by software (for instance, coefficients for implementing a FIR filter or a beamforming operation, weights of a neural network, etc.). The local configuration memory controller 166 may implement specific address schemes.

In one or more embodiments, the local read-only memories $165_0$, $165_1$, ..., $165_{P-1}$ and/or the local configurable coefficient memories $167_0$, $167_1$, ..., $167_{P-1}$ may advantageously be split into a number P of banks equal to the number of processing elements 160 comprised in the hardware accelerator circuit 16. This may facilitate avoiding conflicts during parallel computations.

It is noted that known (e.g., standard) buses used in the design of systems-on-chip, such as AMBA AXI buses or others, may allow only to access consecutive words (or double-words, half-words, or bytes) during a memory access via an incremental or wrapping burst (addressing scheme). Therefore, known bus-based parallel architectures for digital signal processors (e.g., FFT processors) may perform single data transfers from the local memory banks to the processing elements by means of the internal DMAs or by means of address generators, insofar as stride permutations of the data may not be supported by the known types of interconnect (e.g., a standard AXI bus).

Additionally, known buses may lack dedicated signals to specify a particular memory bank access scheme to be used for the burst transaction.

The above-mentioned restrictions on the operation of known buses may result in a limitation in terms of bandwidth, latency and/or processing time for many different types of digital signal processors (e.g., for the computation of a FFT algorithm).

It is noted that processing of algorithms may involve fetching vectors of data from a memory, and/or storing vectors of data into a memory, wherein the vectors of data are separated by a programmable stride. Additionally, according to the computed algorithm, data can be arranged in the memory according to different access patterns, e.g., in order to avoid or reduce memory access collisions.

For instance, considering the exemplary case of FFT computation, the data words for each input and/or output signal of the internal processing elements $160_0$, $160_1$, ..., $160_{P-1}$ in each FFT stage may not be consecutive, but may be spaced by strides (in terms of number of words) having values in the form of powers of 2 (i.e., in the form $2^n$). Thus, an entire data transfer cannot be grouped into a single typical incremental burst. In known solutions, this may result in an increased complexity for the DMA control unit and a higher total computational latency.

Therefore, processing of a variety of algorithms in digital signal processors (e.g., FFT, beamforming, FIR filters, neural networks, etc.) may benefit from providing a way to access (in read mode and/or write mode) data stored in a memory according to incremental bursts having a programmable stride between successive beats.

Additionally, such processing may benefit from providing a way to specify, within the transaction, different memory banks access schemes (e.g., incremental, low-order interleaving, FFT-dedicated, etc.).

In one or more embodiments, the local control unit 161 may comprise a controller circuit of the digital signal processor 16. Such a controller circuit may configure (e.g., dynamically) each of the internal direct memory access controllers 168 with a specific memory access scheme and loop cycle.

In one or more embodiments, the local data memory controller 163 may be configured to arbitrate access (e.g., by the processing elements 160) to the local data memory banks $M_0, \ldots, M_{Q-1}$. For instance, the local data memory controller 163 may use memory access schemes selectable as a function of a signal received from the central processing unit 10 (e.g., for computation of a specific algorithm).

In one or more embodiments, the local data memory controller 163 may translate input read/write transaction bursts (e.g., AXI bursts) generated by the read/write direct memory access controllers into a sequence of read/write memory accesses, according to the specified burst type, burst length and memory access scheme.

Therefore, one or more embodiments of a digital signal processor 16 as exemplified in FIG. 1 may aim at reducing the complexity of the local interconnect network 162 by delegating to the local data memory controller 163 the implementation of the (reconfigurable) connections between the processing elements and the local data memory banks $M_0, \ldots, M_{Q-1}$.

In particular, one or more embodiments may provide a standard-compliant extension of the data transfers that can be issued over the local interconnect 162, making use of optional user signals.

By way of example, in case the local interconnect 162 is an AXI-based interconnect, the AWUSER and/or ARUSER signals may be used in order to improve data transfers between the processing elements 160 and the local data memory banks $M_0, \ldots, M_{Q-1}$.

Again, it will be understood that reference to an AXI-based interconnect is made purely by way of example: one or more embodiments may be applied to any bus-based digital signal processor 16 for which vector accesses with variable stride are executed into memory and user-specific bus signals are available. Also, it will be understood that reference to radix-2 butterfly units as possible processing elements 160 is made purely by way of example: one or more embodiments may be applied to digital signal processors 16 comprising any kind of processing units or math operators 160, e.g., also comprising standard "single instruction, multiple data" (SIMD) vector processors.

As described with reference to FIG. 1, each input terminal of a processing element 160 may have associated therewith a read direct memory access controller (within 168) which allows issuing read burst requests (e.g., AXI read bursts) over the interconnect 162 towards the local data memory banks $M_0, \ldots, M_{Q-1}$ to get the input data to be processed.

Additionally, each output terminal of a processing element 160 has associated therewith a write direct memory access controller (within 168) which allows issuing write burst requests (e.g., AXI write bursts) over the interconnect 162 towards the local data memory banks $M_0, \ldots, M_{Q-1}$ to store the output processed data.

In one or more embodiments, the local data memory controller 163 may receive though the interconnect 162 (e.g., by means of AXI4 slave interfaces) input (AXI) read bursts and/or input (AXI) write bursts generated by the direct memory access controllers 168. The local data memory controller 163 may translate such read and/or write bursts into respective sequences of read memory accesses and/or write memory accesses, according to a specified burst type, burst length and memory access scheme.

In particular, one or more embodiments may rely on the use of user-available signal(s) (such as the signals AWUSER and ARUSER in the AXI standard) for issuing, at the DMAs 168, non-standard incremental burst transactions (in addition to the standard linear incremental burst). For instance, the user-available signal(s) may encode information for performing different stride permutations of different stages of computation of a FFT algorithm.

Additionally, the user-available signal(s) may encode information concerning the memory access scheme that the local data memory controller 163 should use. Indeed, the local data memory controller 163 may implement also memory access schemes which facilitate avoiding memory conflicts during algorithm computation (e.g., FFT computation) when different processing elements 160 are used.

For instance, a first sub-section of a user-available signal may be used to carry information on the stride to be added at each memory transaction starting from an address AxADDR, for each beat of the burst. A second sub-section of the user-available signal may be used to define the access scheme (e.g., FFT-dedicated, low-order interleaving, linear, etc.) to be used by the local data memory controller 163 to map the address on a physical memory location.

Purely by way of example, by referring to the AWUSER and ARUSER signals of an AMBA AXI bus on 16 bits, information may be encoded as follows.

A first sub-section (AWUSER_STRIDE or ARUSER_STRIDE), e.g., comprising the eleven (11) least significant bits of the user-available signal (AWUSER[10:0] or ARUSER[10:0]), may be used to specify the increment for an incremental burst in terms of number of words (8 bytes).

For example, in case of a write burst, addresses different from the start address may be computed according to the following formula:

$$ADDR_{next} = ADDR_{previous} + (AWUSER[10:0]+1)*8$$

Similarly, in case of a read burst, addresses different from the start address may be computed according to the following formula:

$$ADDR_{next} = ADDR_{previous} + (ARUSER[10:0]+1)*8$$

One or more embodiments may thus retain back-compatibility with the (classical) incremental burst scheme (double-word), e.g., in case the extension bits (AWUSER[10:0], ARUSER[10:0]) are tied to 0.

Still with reference to the present example, a second sub-section (AWUSER_SCHEME or ARUSER_SCHEME), e.g., comprising the five (5) most significant bits of the user-available signal (AWUSER[15:11] or ARUSER[15:11]), may be used to specify the address mapping scheme to be used by the local data memory controller 163 to map the addresses on corresponding physical memory locations.

For instance, one bit of the second sub-section (e.g., the most significant bit) may be used to encode information as to whether the access scheme relates to a FFT transaction (e.g., AWUSER[15]=1 or ARUSER[15]=1) or not (e.g., AWUSER[15]=0 or ARUSER[15]=0). The remaining bits of the second sub-section may be used to encode information as to which access scheme should be used. Table II provided in the following summarizes possible encoding of information in such second sub-section of a user-available signal.

TABLE II

| AWUSER[15] ARUSER[15] | AWUSER[14:11] ARUSER[14:11] | Access scheme |
|---|---|---|
| 0 | 0001 | Interleaved (e.g., matrix multiplication) |
| 1 | 0001 | Takala access scheme for a 4096 FFT |
| 1 | 0010 | Takala access scheme for a 2048 FFT |
| 1 | 0011 | Takala access scheme for a 1024 FFT |
| 1 | 0100 | Takala access scheme for a 512 FFT |
| 1 | 0101 | Takala access scheme for a 256 FFT |
| 1 | 0110 | Takala access scheme for a 128 FFT |
| 1 | 0111 | Takala access scheme for a 64 FFT |
| 1 | 1000 | Takala access scheme for a 32 FFT |
| 1 | 1001 | Takala access scheme for a 16 FFT |

In one or more embodiments, by means of the local control unit 161, it may also be possible to program and start the execution of an entire FFT algorithm (e.g., having a maximum length of 4096 complex points) in addition or in alternative to single DMA transfers. The programming of the read DMAs and write DMAs 168 in the processing elements 160 may be done by registers inside the local control unit 161, e.g., through an APB interface. The computation of an entire FFT algorithm may be controlled by a Finite State Machine (FSM) internal to the local control unit 161 which schedules the different computation stages and programs accordingly the DMAs control registers. During computation of a FFT algorithm, the DMAs control registers may not be programmed through the APB interface.

Additionally, the local control unit 161 may run a loop Finite State Machine for each DMA 168. When activated, such a loop FSM may cause a DMA 168, by programming its registers, to issue burst transfers in a loop way, with a determined loop depth. The loop depth may be programmable. The loop depth may have a maximum statistically configurable value (e.g., equal to three). For instance, such a loop FSM may facilitate fetching and/or storing data when performing processing on data arranged in 3D matrixes.

According to a first example, operation one or more embodiments of the present disclosure will now be described with reference to an AXI4-compliant bus in the specific case of computation of a FFT algorithm. Parallel memory-based FFT algorithms may be of interest, e.g., for automotive radar applications or Ultra-WideBand (UWB) communication systems such as OFDM-based systems.

Figure 2:
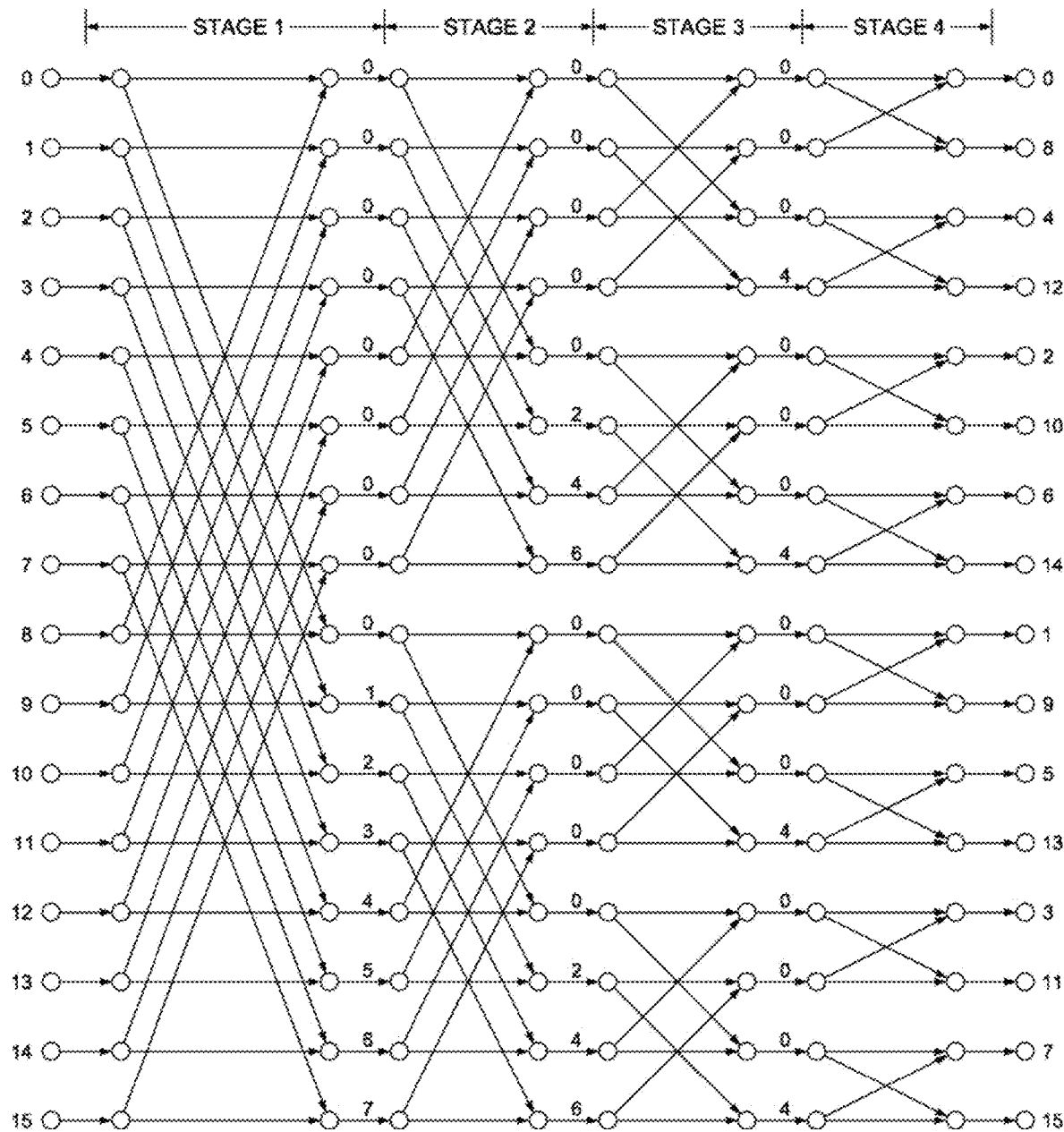
FIG. 2 is a data-flow graph exemplary of a radix-2,16-point Fast Fourier Transform (FFT) algorithm.

A radix-2 FFT algorithm on $2^n$ points can be divided into n different stages with each stage on $2^n/2P$ cycles. At each clock cycle, a single radix-2 processing element 160 may take 2 inputs and provide two results according to the following equations:

$$y[n] = x[n] + x\left[n + \left(\frac{N}{2}\right)\right] \quad 1)$$

$$y\left[n + \frac{N}{2}\right] = \left(x[n] - x\left[n + \frac{N}{2}\right]\right)W_N^n \quad 2)$$

where the factor $W_N^n$ is referred to as a twiddle factor and the N/2 index difference among the processed points is valid for the first stage. For the following stages, a right-shifted version of the initial N/2 difference may be used, as exemplified in the data-flow graph of FIG. 2.

The inputs and outputs may be respectively read and stored in parallel from the local data memory banks, e.g., in case a number of local data memory banks equal to 2*P is provided within the processor 16 (for a radix-2 algorithm).

For each input of a processing element 160, the data read operation may be performed by an internal read DMA. An internal write DMA may perform the write operation for each output into the same local memory location of the corresponding input operand. As a result, such an in-place strategy may facilitate reducing the local memory consumption, which is beneficial for the computation of long Fast Fourier Transforms.

It may thus be desired, in a digital signal processor 16 as per the present example, to provide conflict-free memory bank access schemes implemented inside the local data memory controller 163. Often, the operands to be accessed simultaneously by the processing elements 160 may lie in the same memory module, e.g., as a consequence of the FFT algorithm data reordering between stages exemplified in FIG. 2.

Certain solutions are known in the art, which provide methods to distribute data over the memory modules in such a way that the conflicts can be avoided. For instance, document Takala et al., "*Conflict-Free Parallel Memory Access Scheme For FFT Processors*", Proceedings of the 2003 International Symposium on Circuits and Systems, 25-28 May 2003, Bangkok, pp. IV-IV, doi: 10.1109/ISCAS.2003.1205957, provides a general solution which covers radix-$2^s$ FFTs with a variable number of parallel radix-$2^s$ processing elements.

In one or more embodiments according to the present first example, the local interconnect 162 may be selected to be an AXI4-compliant bus. This may facilitate using automated flow tools available for such open standard.

The user-dependent signals ARUSER and AWUSER may be used, respectively for the read and write burst transactions, in order to encode information for the local data memory controller 163, wherein such information may comprise the stride between two successive beats of a burst when an incremental/wrapping burst is issued, and the memory bank access scheme to be used during the incremental/wrapping burst when it is issued.

Therefore, by extending in a standard-compliant way the supported burst types according to one or more embodiments, the memory transactions (e.g., all memory transactions) inside an FFT stage for an input/output port of a processing element 160, which are stride permutations of the input/output data, may be grouped together into a single burst transaction.

Therefore, the local control unit 161 of the digital signal processor 16 (in the present example, a FFT co-processor), which may be configured to control and program the local DMAs 168 according to the selected FFT algorithm to be computed, may program execution of only one burst per FFT stage per each DMA 168.

Additionally, the total latency of the FFT algorithm may be reduced by improving the memory access.

Table III provided in the following summarizes possible encoding of information in user-available signal(s), e.g., AWUSER and ARUSER, according to the present example.

TABLE III

| AWUSER_SCHEME ARUSER_SCHEME | Description | AWUSER_STRIDE ARUSER_STRIDE | Description |
|---|---|---|---|
| DEFAULT | Linear bank access scheme | N.A. | Standard AXI access scheme |
| FFT4096 | Acc. sch. for a 4096 FFT | 0 to 2047 | Stride to be added at each (single) memory transaction |
| FFT2048 | Acc. sch. for a 2048 FFT | 0 to 1023 | |
| FFT1024 | Acc. sch. for a 1024 FFT | 0 to 511 | |
| FFT512 | Acc. sch. for a 512 FFT | 0 to 255 | |
| FFT256 | Acc. sch. for a 256 FFT | 0 to 127 | |
| FFT128 | Acc. sch. for a 128 FFT | 0 to 63 | |
| FFT64 | Acc. sch. for a 64 FFT | 0 to 31 | |
| FFT32 | Acc. sch. for a 32 FFT | 0 to 15 | |
| FFT16 | Acc. sch. for a 16 FFT | 0 to 7 | |

Table IV provided at the end of the description exemplifies possible usage of a bus extension according to embodiments to compute an N-point Fast Fourier Transform, with $N=2^n$, in case a number P of radix-2 processing elements 160 are provided within the digital signal processor 16.

In Table IV, the operator (>>n) indicates a right-shift of n positions of the initial value stored inside a circular right-shift register.

As exemplified in table IV, input and/or output data transfers for each processing element 160 at each FFT stage may be grouped into single burst transactions. As a result, the internal DMA handling may be simplified and memory access latency may be reduced.

In the presently considered example, the programming of the DMAs 168 during the FFT computation may be done by using simple circular right-shift registers which may be initialized only at the start of the FFT computation according to the selected FFT length, and then updated at the start of each stage.

Tables V-1 to V-4 provided at the end of the description are further exemplary of possible usage of a bus extension according to embodiments to compute a 16-point Fast Fourier Transform by means of four radix-2 processing elements 160 in the digital signal processor 16.

Thus, in the presently considered example of computing a FFT according to one or more embodiments, a single FFT stage may be executed by a single extended burst instead of multiple single accesses, with advantages in terms of throughput, latency, traffic (data transfer efficiency and performance).

By way of second example, operation one or more embodiments of the present disclosure will now be described with reference to an AXI4-compliant bus in the specific case of computation of a matrix product. A matrix product (or scalar product of vectors) may find application in processing related to, e.g., FIR filters, beamforming, neural networks.

A generic product of matrices A(M,N)×B(N,P)=C(M,P) can be computed by using a digital signal processor 16 (e.g., a SIMD vector processor or a processor comprising reconfigurable processing elements 160) comprising a number R of processing elements, and exploiting a bus extension according to one or more embodiments, e.g., to access the system memory.

In the present example, each processing element 160 may comprise a multiply-and-accumulate (MAC) unit and may be used to compute the product between a row of matrix A and a column of matrix B. For computing matrix products, it may turn out to be more efficient to use a low-order interleaving access scheme as mapping method between virtual addresses and physical memory locations, insofar as this may result into a reduction of memory conflicts. Interleaved memory structures are conventionally adopted by vector processors to handle efficiently large data structures, as exemplified by document G. S. Sohi, "*High-Bandwidth Interleaved Memories for Vector Processors-A simulation study*", IEEE Transactions on Computers, Vol. 42, Issue 1, January 1993, pp. 34-44, doi: 10.1109/12.192212.

Table VI provided in the following summarizes possible encoding of information in user-available signal(s), e.g., AWUSER and ARUSER, according to the present example of matrix product.

TABLE VI

| AWUSER_SCHEME ARUSER_SCHEME | Description | AWUSER_STRIDE ARUSER_STRIDE | Description |
|---|---|---|---|
| DEFAULT | Linear bank access scheme | N.A. | Standard AXI access scheme |
| LOINTLV | Low-order interleaving bank access scheme | 0 to max. supported vector length (=N) | Stride to be added at each (single) memory transaction |

Table VII provided at the end of the description exemplifies possible usage of a bus extension according to embodiments to compute a product of matrices A(M,N)×B(N,P)=C(M,P).

Tables VIII-1 to VIII-4 provided at the end of the description are further exemplary of possible usage of a bus extension according to embodiments to compute a product of two 4×4 data matrices by means of four processing elements 160 in the digital signal processor 16.

Thus, in the presently considered example of computing a matrix product according to one or more embodiments, a row×column stage (i.e., a scalar product of vectors) may be executed by a single extended burst instead of multiple single access (without a specific data organization in memory) with advantages in terms of throughput, latency, traffic (data transfer efficiency and performance).

Therefore, one or more embodiments may facilitate implementing a digital signal processing system with one or more of the following advantages: possibility of grouping together into a single burst transaction on the bus the different single memory accesses that are performed by the processing element during digital signal processing algorithms, such as for instance matrix multiplication or FFT; possibility of encoding inside the transaction burst the memory bank access scheme to be used; compatibility with existing bus standards (e.g., AXI4) as a consequence of the use of available optional user-dependent signals of a bus; reduction of the silicon complexity of typical bus-based digital signal processors (e.g., FFT processors) due to an improved handling of the internal data transfers; reduction of the latency related to internal data transfers from the memory, resulting in an improvement of the processing time of different algorithms (e.g., FFT, FIR filters, beamforming, neural networks, etc.); applicability to data processing accelerators or SIMD vector processor.

In one or more embodiments, the electronic system 1 may be implemented as an integrated circuit in a single silicon chip or die (e.g., as a system-on-chip). Alternatively, the electronic system 1 may be a distributed system comprising a plurality of integrated circuits interconnected together, e.g., by means of a printed circuit board (PCB).

As exemplified herein, a method of accessing a memory (e.g., $M_0, \ldots, M_{Q-1}$) for reading and/or writing data may comprise generating (e.g., 168), for instance at a processing circuit (e.g., 160), a memory transaction request comprising a burst of memory access requests towards a set of memory locations in the memory, the memory locations having respective memory addresses, transmitting via an interconnect bus (e.g., 162) to a memory controller circuit (e.g., 163) coupled to the memory a first signal conveying the memory transaction request and a second signal conveying information for mapping the burst of memory access requests onto respective memory addresses of the memory locations in the memory, and computing (e.g., 163), as a function of the information conveyed by the second signal, respective memory addresses of the memory locations and accessing the memory locations to read data from the memory locations and/or to write data into the memory locations.

The read data may be intended for processing by a processing circuit, and the written data may be produced by the processing circuit.

As exemplified herein, the interconnect bus may comprise an Advanced extensible Interface (AXI) bus, and a method may comprise: encoding the first signal and the second signal as a function of an AXI protocol for transmission via the interconnect bus, and transmitting the second signal over an AWUSER channel and/or an ARUSER channel of the AXI bus.

As exemplified herein, a method may comprise generating the memory transaction request comprising an incremental burst of memory access requests or a wrapping burst of memory access requests.

As exemplified herein, a method may comprise including burst type data and burst length data into the memory transaction request conveyed by the first signal.

As exemplified herein, a method may comprise including into the information conveyed by the second signal a stride value indicative of a number of units of data (e.g., a number of data words, with each word being for instance equal to 8 bytes) between two successive memory locations (e.g., two successive beats of the burst) in the burst of memory access requests, and computing the respective memory addresses of the memory locations as a function of the stride value.

As exemplified herein, a method may comprise including data indicative of a determined memory access scheme into the information conveyed by the second signal, and accessing the memory locations to read data from the memory locations and/or to write data into the memory locations as a function of the data indicative of a determined memory access scheme.

As exemplified herein, a method may comprise including into the information conveyed by the second signal data indicative of a memory access scheme selected out of an incremental access scheme, a low-order interleaving access scheme, and an access scheme for computation of a Fast Fourier Transform algorithm (e.g., a Takala access scheme).

As exemplified herein, a method may comprise programming a processing circuit to process data in a plurality of subsequent processing stages, and generating at least one memory transaction requests at each of the processing stages to read data from the memory locations and/or to write data into the memory locations.

As exemplified herein, a circuit (e.g., 16) may comprise a memory for storing data, a processing circuit for processing data, and a memory controller circuit coupled to the memory and coupled to the processing circuit via an interconnect bus.

As exemplified herein, the processing circuit may be configured to generate memory transaction requests comprising respective bursts of memory access requests towards a set of memory locations in the memory, the memory locations having respective memory addresses, and transmit via the interconnect bus to the memory controller circuit first signals conveying the memory transaction requests and second signals conveying information for mapping the bursts of memory access requests onto respective memory addresses of the memory locations in the memory.

As exemplified herein, the memory controller circuit may be configured to compute, as a function of the information conveyed by the second signals, respective memory addresses of the memory locations, and access the memory locations to read data from the memory locations for processing by the processing circuit and/or to write data processed by the processing circuit into the memory locations.

Without prejudice to the underlying principles, the details and embodiments may vary, even significantly, with respect to what has been described byway of example only, without departing from the extent of protection.

The extent of protection is defined by the annexed claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

TABLE IV

| #PE | AXI BURST | Stage 0 Burst Value | Point Index sequence | Stage 1 Burst Value | Point Index sequence | Stage n − 1 Burst Value | Point Index sequence |
|---|---|---|---|---|---|---|---|
| i | DMAR X0 | ARUSER_STRIDE P | i, i + P, ... | P >> 1 | i >> 1, | P >> (n − 1) = 2P | i >> (n − 1) = 2i, |
|   |   | ARUSER_SCHEME FFTN |   | FFTN | (i >> 1) + (P >> 1), ... | FFTN | 2i + 2P, ... |
|   |   | ARLEN N/(2P) |   | N/(2P) |   | N/(2P) |   |
|   |   | ARBURST b01 |   | b01 |   | b01 |   |
|   | DMAR X1 | ARUSER_STRIDE P | (i + N/2), | P >> 1 | (i >> 1) + N/4, ... | 2P | (i >> n − 1 = 2i) + 1, |
|   |   | ARUSER_SCHEME FFTN | (i + N/2) + P | FFTN |   | FFTN | 2i + 1 + 2P, ... |
|   |   | ARLEN N/(2P) |   | N/(2P) |   | N/(2P) |   |
|   |   | ARBURST b01 |   | b01 |   | b01 |   |
|   | DMAW Y0 | AWUSER_STRIDE P | i, | P >> 1 | i >> 1, | P >> (n − 1) = 2P | i >> n − 1 = 2i, |
|   |   | AWUSER_SCHEME FFTN | i + P, | FFTN | (i >> 1) + (P >> 1), ... | FFTN | 2i + 2P, ... |
|   |   | AWLEN N/(2P) |   | N/(2P) |   | N/(2P) |   |
|   |   | AWBURST b01 |   | b01 |   | b01 |   |
|   | DMAW Y1 | AWUSER_STRIDE P | i + N/2, | P >> 1 | (i >> 1) + N/4, ... | P >> (n − 1) = 2P | (i >> n − 1 = 2i) + 1, |
|   |   | AWUSER_SCHEME FFTN | i + N/2 + P, | FFTN |   | FFTN | 2i + 1 + 2P, ... |
|   |   | AWLEN N/(2P) | ... | N/(2P) |   | N/(2P) |   |
|   |   | AWBURST b01 |   | b01 |   | b01 |   |

TABLE V-1

| #PE | AXI BURST | Stage 0 Burst Value | Point Index sequence | Stage 1 Burst Value | Point Index sequence | Stage 2 Burst Value | Point Index sequence | Stage 3 Burst Value | Point Index sequence |
|---|---|---|---|---|---|---|---|---|---|
| 0 | DMAR X0 | ARUSER_STRIDE d4 | 0-4 | d2 | 0-2 | d1 | 0-1 | d8 | 0-8 |
|   |   | ARUSER_SCHEME FFT16 |   | FFT16 |   | FFT16 |   | FFT16 |   |
|   |   | ARLEN d1 |   | d1 |   | d1 |   | d1 |   |
|   |   | ARBURST b01 |   | b01 |   | b01 |   | b01 |   |
|   | DMAR X1 | ARUSER_STRIDE d4 | 8-12 | d2 | 4-6 | d1 | 2-3 | d8 | 1-9 |
|   |   | ARUSER_SCHEME FFT16 |   | FFT16 |   | FFT16 |   | FFT16 |   |
|   |   | ARLEN d1 |   | d1 |   | d1 |   | d1 |   |
|   |   | ARBURST b01 |   | b01 |   | b01 |   | b01 |   |
|   | DMAW Y0 | AWUSER_STRIDE d4 | 0-4 | d2 | 0-2 | d1 | 0-1 | d8 | 0-8 |
|   |   | AWUSER_SCHEME FFT16 |   | FFT16 |   | FFT16 |   | FFT16 |   |
|   |   | AWLEN d1 |   | d1 |   | d1 |   | d1 |   |
|   |   | AWBURST b01 |   | b01 |   | b01 |   | b01 |   |
|   | DMAW Y1 | AWUSER_STRIDE d4 | 8-12 | d2 | 4-6 | d1 | 2-3 | d8 | 1-9 |
|   |   | AWUSER_SCHEME FFT16 |   | FFT16 |   | FFT16 |   | FFT16 |   |
|   |   | AWLEN d1 |   | d1 |   | d1 |   | d1 |   |
|   |   | AWBURST b01 |   | b01 |   | b01 |   | b01 |   |

TABLE V-2

| #PE | AXI BURST | Stage 0 Burst Value | Point Index sequence | Stage 1 Burst Value | Point Index sequence | Stage 2 Burst Value | Point Index sequence | Stage 3 Burst Value | Point Index sequence |
|---|---|---|---|---|---|---|---|---|---|
| 1 | DMAR X0 | ARUSER_STRIDE d4 | 1-5 | d2 | 8-10 | d1 | 4-5 | d8 | 2-10 |
|   |   | ARUSER_SCHEME FFT16 |   | FFT16 |   | FFT16 |   | FFT16 |   |
|   |   | ARLEN d1 |   | d1 |   | d1 |   | d1 |   |
|   |   | ARBURST b01 |   | b01 |   | b01 |   | b01 |   |
|   | DMAR X1 | ARUSER_STRIDE d4 | 9-13 | d2 | 12-14 | d1 | 6-7 | d8 | 3-11 |
|   |   | ARUSER_SCHEME FFT16 |   | FFT16 |   | FFT16 |   | FFT16 |   |
|   |   | ARLEN d1 |   | d1 |   | d1 |   | d1 |   |
|   |   | ARBURST b01 |   | b01 |   | b01 |   | b01 |   |
|   | DMAW Y0 | AWUSER_STRIDE d4 | 1-5 | d2 | 8-10 | d1 | 4-5 | d8 | 2-10 |
|   |   | AWUSER_SCHEME FFT16 |   | FFT16 |   | FFT16 |   | FFT16 |   |
|   |   | AWLEN d1 |   | d1 |   | d1 |   | d1 |   |
|   |   | AWBURST b01 |   | b01 |   | b01 |   | b01 |   |

TABLE V-2-continued

| #PE | AXI BURST | Stage 0 Burst Value | Point Index sequence | Stage 1 Burst Value | Point Index sequence | Stage 2 Burst Value | Point Index sequence | Stage 3 Burst Value | Point Index sequence |
|---|---|---|---|---|---|---|---|---|---|
| | DMAW Y1 | AWUSER_STRIDE d4 | 9-13 | d2 | 12-14 | d1 | 6-7 | d8 | 3-11 |
| | | AWUSER_SCHEME FFT16 | | FFT16 | | FFT16 | | FFT16 | |
| | | AWLEN d1 | | d1 | | d1 | | d1 | |
| | | AWBURST b01 | | b01 | | b01 | | b01 | |

TABLE V-3

| #PE | AXI BURST | Stage 0 Burst Value | Point Index sequence | Stage 1 Burst Value | Point Index sequence | Stage 2 Burst Value | Point Index sequence | Stage 3 Burst Value | Point Index sequence |
|---|---|---|---|---|---|---|---|---|---|
| 2 | DMAR X0 | ARUSER_STRIDE d4 | 2-6 | d2 | 1-3 | d1 | 8-9 | d8 | 4-12 |
| | | ARUSER_SCHEME FFT16 | | FFT16 | | FFT16 | | FFT16 | |
| | | ARLEN d1 | | d1 | | d1 | | d1 | |
| | | ARBURST b01 | | b01 | | b01 | | b01 | |
| | DMAR X1 | ARUSER_STRIDE d4 | 10-14 | d2 | 5-7 | d1 | 10-11 | d8 | 5-13 |
| | | ARUSER_SCHEME FFT16 | | FFT16 | | FFT16 | | FFT16 | |
| | | ARLEN d1 | | d1 | | d1 | | d1 | |
| | | ARBURST b01 | | b01 | | b01 | | b01 | |
| | DMAW Y0 | AWUSER_STRIDE d4 | 2-6 | d2 | 1-3 | d1 | 8-9 | d8 | 4-12 |
| | | AWUSER_SCHEME FFT16 | | FFT16 | | FFT16 | | FFT16 | |
| | | AWLEN d1 | | d1 | | d1 | | d1 | |
| | | AWBURST b01 | | b01 | | b01 | | b01 | |
| | DMAW Y1 | AWUSER_STRIDE d4 | 10-14 | d2 | 5-7 | d1 | 10-11 | d8 | 5-13 |
| | | AWUSER_SCHEME FFT16 | | FFT16 | | FFT16 | | FFT16 | |
| | | AWLEN d1 | | d1 | | d1 | | d1 | |
| | | AWBURST b01 | | b01 | | b01 | | b01 | |

TABLE V-4

| #PE | AXI BURST | Stage 0 Burst Value | Point Index sequence | Stage 1 Burst Value | Point Index sequence | Stage 2 Burst Value | Point Index sequence | Stage 3 Burst Value | Point Index sequence |
|---|---|---|---|---|---|---|---|---|---|
| 3 | DMAR X0 | ARUSER_STRIDE d4 | 3-7 | d2 | 9-11 | d1 | 12-13 | d8 | 6-14 |
| | | ARUSER_SCHEME FFT16 | | FFT16 | | FFT16 | | FFT16 | |
| | | ARLEN d1 | | d1 | | d1 | | d1 | |
| | | ARBURST b01 | | b01 | | b01 | | | |
| | DMAR X1 | ARUSER_STRIDE d4 | 11-15 | d2 | 13-15 | d1 | 14-15 | d8 | 7-15 |
| | | ARUSER_SCHEME FFT16 | | FFT16 | | FFT16 | | FFT16 | |
| | | ARLEN d1 | | d1 | | d1 | | d1 | |
| | | ARBURST b01 | | b01 | | b01 | | b01 | |
| | DMAW Y0 | AWUSER_STRIDE d4 | 3-7 | d2 | 9-11 | d1 | 12-13 | d8 | 6-14 |
| | | AWUSER_SCHEME FFT16 | | FFT16 | | FFT16 | | FFT16 | |
| | | AWLEN d1 | | d1 | | d1 | | d1 | |
| | | AWBURST b01 | | b01 | | b01 | | b01 | |
| | DMAW Y1 | AWUSER_STRIDE d4 | 11-15 | d2 | 13-15 | d1 | 14-15 | d8 | 7-15 |
| | | AWUSER_SCHEME FFT16 | | FFT16 | | FFT16 | | FFT16 | |
| | | AWLEN d1 | | d1 | | d1 | | d1 | |
| | | AWBURST b01 | | b01 | | b01 | | b01 | |

TABLE VII

| #PE | AXI BURST | | Stage 0 | | Stage 1 | | Stage P − 1 | |
|---|---|---|---|---|---|---|---|---|
| i | DMAR X0 | ARUSER_STRIDE | d1 | i-th | d1 | i-th | d1 | i-th |
| | | ARUSER_SCHEME | LOINTLV | A_row | LOINTLV | A_row | LOINTLV | A_row |
| | | ARLEN | N | | N | | N | |
| | | ARBURST | b01 | | b01 | | b01 | |
| | DMAR X1 | ARUSER_STRIDE | P | i-th | P | (i-th + 1) % P | P − 1 | (i-th + P − 1) % P |
| | | ARUSER_SCHEME | LOINTLV | B_col | LOINTLV | B_col | LOINTLV | B_col |
| | | ARLEN | N | | N | | N | |
| | | ARBURST | b01 | | b01 | | b01 | |
| | DMAW Y0 | AWUSER_STRIDE | d0 | $c_{ii}$ | d0 | $c_{i(i+1)\%P}$ | d0 | $C_{i(i+P-1)\%P}$ |
| | | AWUSER_SCHEME | LOINTLV | | LOINTLV | | LOINTLV | |
| | | AWLEN | d1 | | d1 | | d1 | |
| | | AWBURST | b01 | | b01 | | b01 | |

TABLE VIII-1

| #PE | AXI BURST | | Stage 0 | | Stage 1 | | Stage 2 | | Stage 3 | |
|---|---|---|---|---|---|---|---|---|---|---|
| 0 | DMAR X0 | ARUSER_OFFSET | d1 | $1^{st}$ | d1 | $1^{st}$ | d1 | $1^{st}$ | d1 | $1^{st}$ |
| | | ARUSER_SCHEME | LOINTLV | A_row | LOINTLV | A_row | LOINTLV | A_row | LOINTLV | A_row |
| | | ARLEN | d4 | | d4 | | d4 | | d4 | |
| | | ARBURST | b01 | | b01 | | b01 | | b01 | |
| | DMAR X1 | ARUSER_OFFSET | d4 | $1^{st}$ | d4 | $4^{th}$ | d4 | $3^{rd}$ | d4 | $2^{nd}$ |
| | | ARUSER_SCHEME | LOINTLV | B_col | LOINTLV | B_col | LOINTLV | B_col | LOINTLV | B_col |
| | | ARLEN | d4 | | d4 | | d4 | | d4 | |
| | | ARBURST | b01 | | b01 | | b01 | | b01 | |
| | DMAW Y0 | AWUSER_OFFSET | d0 | $c_{00}$ | d0 | $c_{03}$ | d0 | $c_{02}$ | d0 | $c_{01}$ |
| | | AWUSER_SCHEME | LOINTLV | | LOINTLV | | LOINTLV | | LOINTLV | |
| | | AWLEN | d1 | | d1 | | d1 | | d1 | |
| | | AWBURST | b01 | | b01 | | b01 | | b01 | |

TABLE VIII-2

| #PE | AXI BURST | | Stage 0 | | Stage 1 | | Stage 2 | | Stage 3 | |
|---|---|---|---|---|---|---|---|---|---|---|
| 1 | DMAR X0 | ARUSER_OFFSET | d1 | $2^{nd}$ | d1 | $2^{nd}$ | d1 | $2^{nd}$ | d1 | $2^{nd}$ |
| | | ARUSER_SCHEME | LOINTLV | A_row | LOINTLV | A_row | LOINTLV | A_row | LOINTLV | A_row |
| | | ARLEN | d4 | | d4 | | d4 | | d4 | |
| | | ARBURST | b01 | | b01 | | b01 | | b01 | |
| | DMAR X1 | ARUSER_OFFSET | d4 | $2^{nd}$ | d4 | $1^{st}$ | d4 | $4^{th}$ | d4 | $3^{rd}$ |
| | | ARUSER_SCHEME | LOINTLV | B_col | LOINTLV | B_col | LOINTLV | B_col | LOINTLV | B_col |
| | | ARLEN | d4 | | d4 | | d4 | | d4 | |
| | | ARBURST | b01 | | b01 | | b01 | | b01 | |
| | DMAW Y0 | AWUSER_OFFSET | d0 | $c_{11}$ | d0 | $c_{10}$ | d0 | $c_{13}$ | d0 | $c_{12}$ |
| | | AWUSER_SCHEME | LOINTLV | | LOINTLV | | LOINTLV | | LOINTLV | |
| | | AWLEN | d1 | | d1 | | d1 | | d1 | |
| | | AWBURST | b01 | | b01 | | b01 | | b01 | |

TABLE VIII-3

| #PE | AXI BURST | | Stage 0 | | Stage 1 | | Stage 2 | | Stage 3 | |
|---|---|---|---|---|---|---|---|---|---|---|
| 2 | DMAR X0 | ARUSER_OFFSET | d1 | $3^{rd}$ | d1 | $3^{rd}$ | d1 | $3^{rd}$ | d1 | $3^{rd}$ |
| | | ARUSER_SCHEME | LOINTLV | A_row | LOINTLV | A_row | LOINTLV | A_row | LOINTLV | A_row |
| | | ARLEN | d4 | | d4 | | d4 | | d4 | |
| | | ARBURST | b01 | | b01 | | b01 | | b01 | |
| | DMAR X1 | ARUSER_OFFSET | d4 | $3^{rd}$ | d4 | $2^{nd}$ | d4 | $1^{st}$ | d4 | $4^{th}$ |
| | | ARUSER_SCHEME | LOINTLV | B_col | LOINTLV | B_col | LOINTLV | B_col | LOINTLV | B_col |
| | | ARLEN | d4 | | d4 | | d4 | | d4 | |
| | | ARBURST | b01 | | b01 | | b01 | | b01 | |
| | DMAW Y0 | AWUSER_OFFSET | d0 | $c_{22}$ | d0 | $c_{21}$ | d0 | $c_{20}$ | d0 | $c_{23}$ |
| | | AWUSER_SCHEME | LOINTLV | | LOINTLV | | LOINTLV | | LOINTLV | |
| | | AWLEN | d1 | | d1 | | d1 | | d1 | |
| | | AWBURST | b01 | | b01 | | b01 | | b01 | |

TABLE VIII-4

| #PE | | AXI BURST | Stage 0 | | Stage 1 | | Stage 2 | | Stage 3 | |
|---|---|---|---|---|---|---|---|---|---|---|
| 3 | DMAR X0 | ARUSER_OFFSET | d1 | $4^{th}$ | d1 | $4^{th}$ | d1 | $4^{th}$ | d1 | $4^{th}$ |
| | | ARUSER_SCHEME | LOINTLV | A_row | LOINTLV | A_row | LOINTLV | A_row | LOINTLV | A_row |
| | | ARLEN | d4 | | d4 | | d4 | | d4 | |
| | | ARBURST | b01 | | b01 | | b01 | | b01 | |
| | DMAR X1 | ARUSER_OFFSET | d4 | $4^{th}$ | d4 | $3^{rd}$ | d4 | $2^{nd}$ | d4 | $1^{st}$ |
| | | ARUSER_SCHEME | LOINTLV | B_col | LOINTLV | B_col | LOINTLV | B_col | LOINTLV | B_col |
| | | ARLEN | d4 | | d4 | | d4 | | d4 | |
| | | ARBURST | b01 | | b01 | | b01 | | b01 | |
| | DMAW Y0 | AWUSER_OFFSET | d0 | $c_{33}$ | d0 | $c_{32}$ | d0 | $c_{31}$ | d0 | $c_{30}$ |
| | | AWUSER_SCHEME | LOINTLV | | LOINTLV | | LOINTLV | | LOINTLV | |
| | | AWLEN | d1 | | d1 | | d1 | | d1 | |
| | | AWBURST | b01 | | b01 | | b01 | | b01 | |

What is claimed is:

1. A method of accessing a memory for reading and/or writing data, the method comprising:
generating a memory transaction request comprising a burst of memory access requests towards a set of memory locations in the memory, the memory locations having respective memory addresses;
transmitting, via an interconnect bus to a memory controller circuit coupled to the memory, a first signal conveying the memory transaction request, and a second signal conveying information for mapping the burst of memory access requests onto respective memory addresses of the memory locations in the memory, the information including a stride value indicative of a number of units of data between two successive memory locations in the burst of memory access requests; and
computing, as a function of the information conveyed by the second signal, including the stride value, respective memory addresses of the memory locations and accessing the memory locations to read data from the memory locations and/or to write data into the memory locations.

2. The method of claim 1, wherein the interconnect bus comprises an Advanced eXtensible Interface (AXI) bus, the method comprising:
encoding the first signal and the second signal as a function of an AXI protocol for transmission via the interconnect bus; and
transmitting the second signal over an AWUSER channel and/or an ARUSER channel of the AXI bus.

3. The method of claim 1, wherein generating the memory transaction request comprises an incremental burst of memory access requests or a wrapping burst of memory access requests.

4. The method of claim 1, further comprising including burst type data and burst length data in the memory transaction request conveyed by the first signal.

5. The method of claim 1, further comprising:
including data indicative of a memory access scheme in the information conveyed by the second signal; and
accessing the memory locations to read data from the memory locations and/or to write data into the memory locations as a function of the data indicative of the memory access scheme.

6. The method of claim 5, wherein the memory access scheme is selected from: an incremental access scheme, a low-order interleaving access scheme, or an access scheme for computation of a Fast Fourier Transform algorithm.

7. The method of claim 1, further comprising:
programming a processing circuit to process data in a plurality of subsequent processing stages; and
generating at least one memory transaction request at each of the subsequent processing stages to read data from the memory locations and/or to write data into the memory locations.

8. A circuit comprising:
a memory for storing data;
a processing circuit for processing data;
a memory controller circuit; and
an interconnect bus; coupling the memory controller circuit to the memory and the processing circuit;
wherein the processing circuit is configured to:
generate memory transaction requests comprising respective bursts of memory access requests towards a set of memory locations in the memory, the memory locations having respective memory addresses; and
transmit via the interconnect bus to the memory controller circuit first signals conveying the memory transaction requests, and second signals conveying information for mapping the bursts of memory access requests onto respective memory addresses of the memory locations in the memory, the information including a stride value indicative of a number of units of data between two successive memory locations in the burst of memory access requests; and
wherein the memory controller circuit is configured to:
compute, as a function of the information conveyed by the second signals, including the stride value, respective memory addresses of the memory locations; and
access the memory locations to read data from the memory locations for processing by the processing circuit and/or to write data processed by the processing circuit into the memory locations.

9. The circuit of claim 8, wherein the interconnect bus comprises an Advanced eXtensible Interface (AXI) bus, and wherein the processing circuit is further configured to:
encode the first signals and the second signals as a function of an AXI protocol for transmission via the interconnect bus; and
transmit the second signals over an AWUSER channel and/or an ARUSER channel of the AXI bus.

10. The circuit of claim 8, wherein each memory transaction request comprises an incremental burst of memory access requests or a wrapping burst of memory access requests.

11. The circuit of claim 8, wherein each memory transaction request conveyed by the first signals includes burst type data and burst length data in.

12. The circuit of claim 8,
wherein the processing circuit is configured to include data indicative of a memory access scheme in the information conveyed by the second signals; and
wherein the memory controller circuit is configured to access the memory locations to read data from the memory locations and/or to write data into the memory locations as a function of the data indicative of the memory access scheme.

13. The circuit of claim 12, wherein the memory access scheme is selected from: an incremental access scheme, a low-order interleaving access scheme, or an access scheme for computation of a Fast Fourier Transform algorithm.

14. The circuit of claim 8,
wherein the processing circuit is programmed to process data in a plurality of subsequent processing stages; and
wherein the processing circuit is configured to generate at least one memory transaction request at each of the subsequent processing stages to read data from the memory locations and/or to write data into the memory locations.

15. An electronic system comprising:
system interconnect network;
a central processing unit coupled to the system interconnect network;
a main system memory coupled to the system interconnect network;
a direct memory access controller coupled to the system interconnect network; and
a digital signal processor coupled to the system interconnect network, the digital signal processor comprising:
a local memory for storing data;
a local processing circuit for processing data;
a local memory controller circuit; and
a local interconnect bus; coupling the local memory controller circuit to the local memory and the local processing circuit;
wherein the local processing circuit is configured to:
generate memory transaction requests comprising respective bursts of memory access requests towards a set of memory locations in the local memory, the memory locations having respective memory addresses; and
transmit via the local interconnect bus to the local memory controller circuit first signals conveying the memory transaction requests and second signals conveying information for mapping the bursts of memory access requests onto respective memory addresses of the memory locations in the local memory, the information including a stride value indicative of a number of units of data between two successive memory locations in the burst of memory access requests; and
wherein the local memory controller circuit is configured to:
compute, as a function of the information conveyed by the second signals, including the stride value, respective memory addresses of the memory locations; and
access the memory locations to read data from the memory locations for processing by the local processing circuit and/or to write data processed by the local processing circuit into the memory locations.

16. The electronic system according to claim 15, wherein the local interconnect bus comprises an Advanced eXtensible Interface (AXI) bus, and wherein the local processing circuit is further configured to:
encode the first signals and the second signals as a function of an AXI protocol for transmission via the local interconnect bus; and
transmit the second signals over an AWUSER channel and/or an ARUSER channel of the AXI bus.

17. The electronic system according to claim 15, wherein each memory transaction request comprises an incremental burst of memory access requests or a wrapping burst of memory access requests.

18. The electronic system according to claim 15, wherein each memory transaction request conveyed by the first signals includes burst type data and burst length data in.

19. The electronic system according to claim 15,
wherein the local processing circuit is configured to include data indicative of a memory access scheme in the information conveyed by the second signals; and
wherein the local memory controller circuit is configured to access the memory locations to read data from the memory locations and/or to write data into the memory locations as a function of the data indicative of the memory access scheme.

* * * * *